United States Patent
Nicewarner (10) Patent No.: US 7,204,143 B1
(45) Date of Patent: Apr. 17, 2007

(54) LIQUID LEVEL CONTROLLER

(75) Inventor: Ivy J. Nicewarner, Magnolia, TX (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 11/231,427

(22) Filed: Sep. 20, 2005

(51) Int. Cl.
*G01F 23/32* (2006.01)

(52) U.S. Cl. .................................... 73/317
(58) Field of Classification Search ............... 73/317
See application file for complete search history.

(56) References Cited

U.S. PATENT DOCUMENTS

| | | | |
|---|---|---|---|
| 4,483,367 A * | 11/1984 | Ross et al. ............... 137/416 |
| 4,700,738 A | 10/1987 | Frese et al. |
| 4,746,776 A * | 5/1988 | Komaniak ............... 200/84 R |
| 5,191,912 A | 3/1993 | McDaniel |
| 5,775,877 A * | 7/1998 | Genz ....................... 417/41 |
| 5,992,448 A | 11/1999 | Anderson et al. |
| 6,220,566 B1 | 4/2001 | Miller |
| 6,240,955 B1 | 6/2001 | Anderson et al. |
| 6,354,323 B1 | 3/2002 | Anderson |
| 6,497,246 B1 | 12/2002 | Nicewarner et al. |
| 6,591,860 B1 | 7/2003 | Weber et al. |
| 6,629,627 B1 | 10/2003 | Siegele et al. |
| 6,901,796 B2 * | 6/2005 | Akagawa ............... 73/313 |
| 6,966,334 B2 * | 11/2005 | Bolster ................. 137/434 |
| 2001/0032507 A1 * | 10/2001 | Eck ........................ 73/317 |

* cited by examiner

*Primary Examiner*—Robert Raevis
(74) *Attorney, Agent, or Firm*—Fellers Snider, et al.

(57) ABSTRACT

An apparatus and methods of using the apparatus are disclosed. Preferably, the apparatus includes at least a fluid level detection portion communicating with a fulcrum that provides at least a first lobe and a second lobe, and a control portion responsive to the first lobe when the apparatus is operated in a first operating mode and responsive to the second lobe when the apparatus is operated in a second operating mode. The apparatus preferably further includes a counterbalance mechanism linked to the fluid level detection device, wherein the apparatus operates in the first mode when a first balance force is applied by the counterbalance mechanism to the fluid level detection device, and further operates in the second mode when a second balance force is applied by the counterbalance mechanism to the fluid level detection device.

7 Claims, 6 Drawing Sheets

LIQUID LEVEL CONTROLLER

FIELD OF THE INVENTION

This invention relates to fluid level monitoring devices, and in particular, but not by way of limitation, to liquid level controllers providing an ability to operate in either a direct or an indirect liquid level detection mode.

BACKGROUND

The present invention relates to an improved liquid level controller. Frequently, process intensive industries utilize process valves, which are operated by means of a pneumatic or electrical control signal, for the control of process fluids. The pneumatic control for such valves typically includes a pilot valve, whose function is to send an output signal pressure to the pneumatic controller, which either opens or closes the process valve. In the typical prior art system, the control of liquid levels in vessels has long been accomplished through use of a float whose motion or buoyancy force is transmitted to a pneumatic or electric controller which is connected to a process valve for opening and closing flow of liquid from the vessel.

In a typical operating environment, pneumatic pressure supplied to the pilot valve is used to facilitate operational control of process valves. When the liquid level in the vessel is within the desired limit, the pneumatic pressure is withheld from a discharge port, which is used to signal activation or deactivation of a process valve. As liquid within a vessel rises or falls sufficiently to change the position of the float, the pilot valve is activated to permit transfer of the pneumatic pressure through the discharge port to control operation of a process valve. For example, selectively activating a discharge valve or inlet valve to raise or lower fluid in a vessel results from activation of the pilot valve.

Many of the prior art devices were difficult to reconfigure from a direct operating mode (rising level increases pilot valve output), to an indirect operating mode (falling level increases pilot valve output) and vice versa, often leading to an inventorying of both operational mode devices, while other prior art devices necessitate a positional change in components of the device used to transmit the buoyancy force of the float to the pilot valve.

Accordingly, as market pressures continue to demand liquid level controllers that provide lower cost, greater reliability, and improved ease of use, challenges remain and a need persists for improvements in methods and apparatuses for use in fluid level monitoring and control devices.

BRIEF SUMMARY OF THE INVENTION

In accordance with preferred embodiments, an apparatus includes at least a fluid level detection portion communicating with a fulcrum, which provides at least a first lobe and a second lobe, and a control portion. The control portion preferably responds to the first lobe when the apparatus is operated in a first operating mode, and responds to the second lobe when the apparatus is operated in a second operating mode. The apparatus preferably also includes, a counterbalance mechanism linked to the fluid level detection device, wherein the apparatus operates in the first mode when a first balance force is applied by the counterbalance mechanism to the fluid level detection device, and further operates in the second mode when a second balance force, separate and distinct from the first balance force is applied by the counterbalance mechanism to the fluid level detection device.

In a preferred embodiment, a method of using the apparatus in a direct operating mode preferably includes the steps of: adjusting a force adjustment knob to counterbalance a mass of a displacer of a fluid level detection device; adjusting a level of fluid in a vessel to just below a bottom portion of the displacer of the fluid level detection device; rotating a force adjustment knob in a first rotational direction until all compressive force is relieved from a compressive force delivery device acting on the force adjustment knob; and reading a measurement device to confirm presence of an output signal.

The preferred method of using the apparatus in the direct operating mode further includes the steps of: turning the force adjustment knob in a second rotational direction until a pilot thrust pin just deactivates a control switch, thereby halting the presence of the output signal; continue turning the force adjustment knob in the second direction until the pilot thrust pin just activates the control switch, thereby providing the presence of the output signal; re-rotating the force adjustment knob in the first rotational direction until the pilot thrust pin just deactivates the control switch, thereby halting the presence of the output signal; re-reading the measurement device to confirm the non-presence of the output signal; and raising the level of fluid in the vessel until the pilot thrust pin just activates the control switch, thereby providing the presence of the output signal.

In a preferred embodiment, a method of using the apparatus in an indirect operating mode preferably includes the steps of: adjusting a force adjustment knob to counterbalance a mass of a displacer of a fluid level detection device; altering a level of a liquid in a vessel to just submerge the displacer of the liquid level detection device; reading a measurement device to confirm presence of an output signal; rotating a force adjustment knob in a counterclockwise direction until a pilot thrust pin just deactivates a control switch, thereby halting the presence of the output signal; and re-reading the measurement device to confirm non-presence of the output signal.

The preferred method of using the apparatus in the indirect operating mode further includes the steps of: resuming rotation of the force adjustment knob in the counterclockwise direction until all compressive force is relieved from a compression spring acting on the force adjustment knob; re-reading the measurement device to confirm presence of an output signal; turning the force adjustment knob in a clockwise direction until the pilot thrust pin just deactivates the control switch, thereby providing the non-presence of the output signal; re-reading the measurement device to confirm the non-presence of the output signal; and lowering the level of the liquid until the pilot thrust pin just activates the control switch, thereby providing the presence of the output signal.

These and various other features and advantages that characterize the claimed invention will be apparent upon reading the following detailed description and upon review of the associated drawings.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
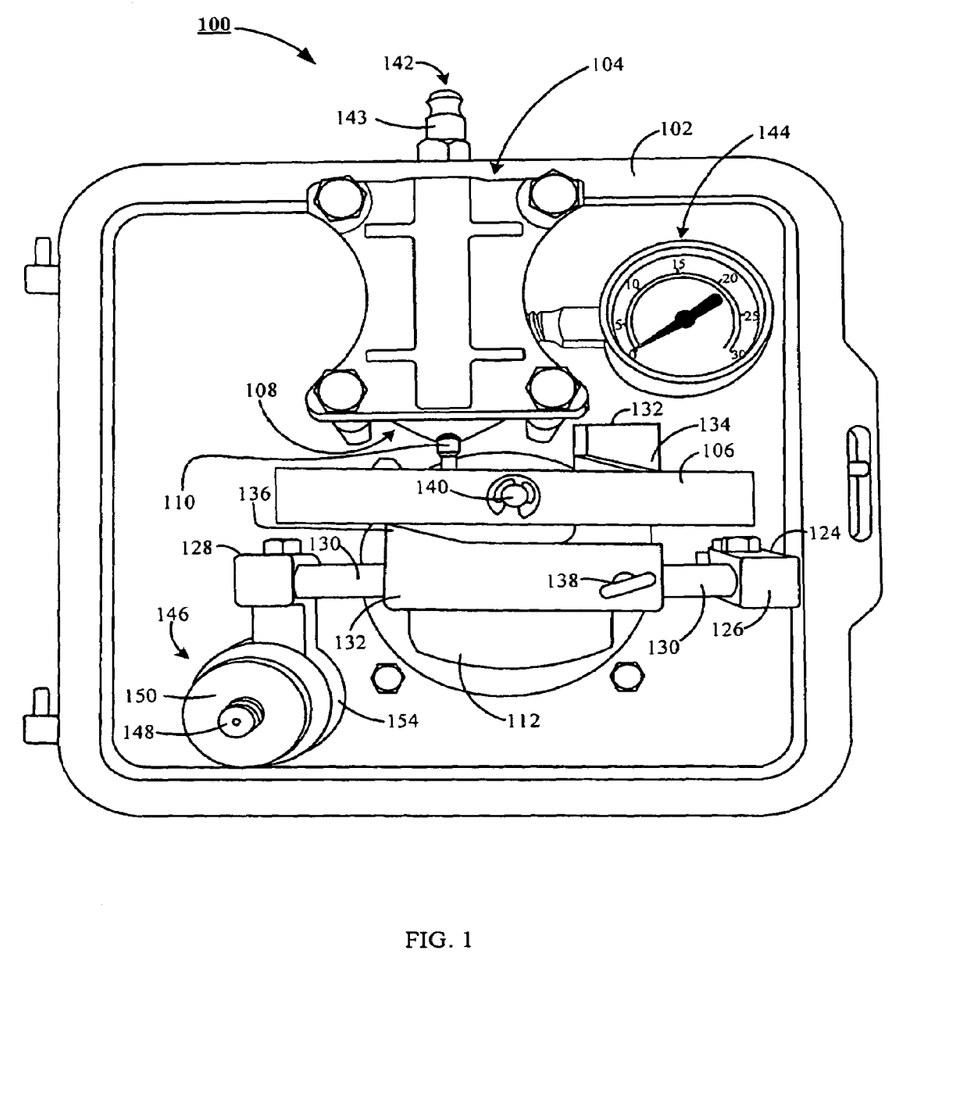
FIG. 1 shows a front elevational view of an embodiment of an inventive liquid level controller.

Referring to the drawings, FIG. 1 shows an inventive fluid level controller apparatus 100, which preferably includes at least a mounting plate 102, a control portion 104 secured to the mounting plate 102, and a torque bar 106, that interacts with a control switch 108, of the control portion 104 to, provide a control signal output. In a preferred embodiment the control switch 108 is a pneumatic switch, the control signal output is a pneumatic signal, provided at a predetermined pressure, and the torque bar 106 acts on a pilot thrust pin 110 to activate the control switch 108.

Figure 2:
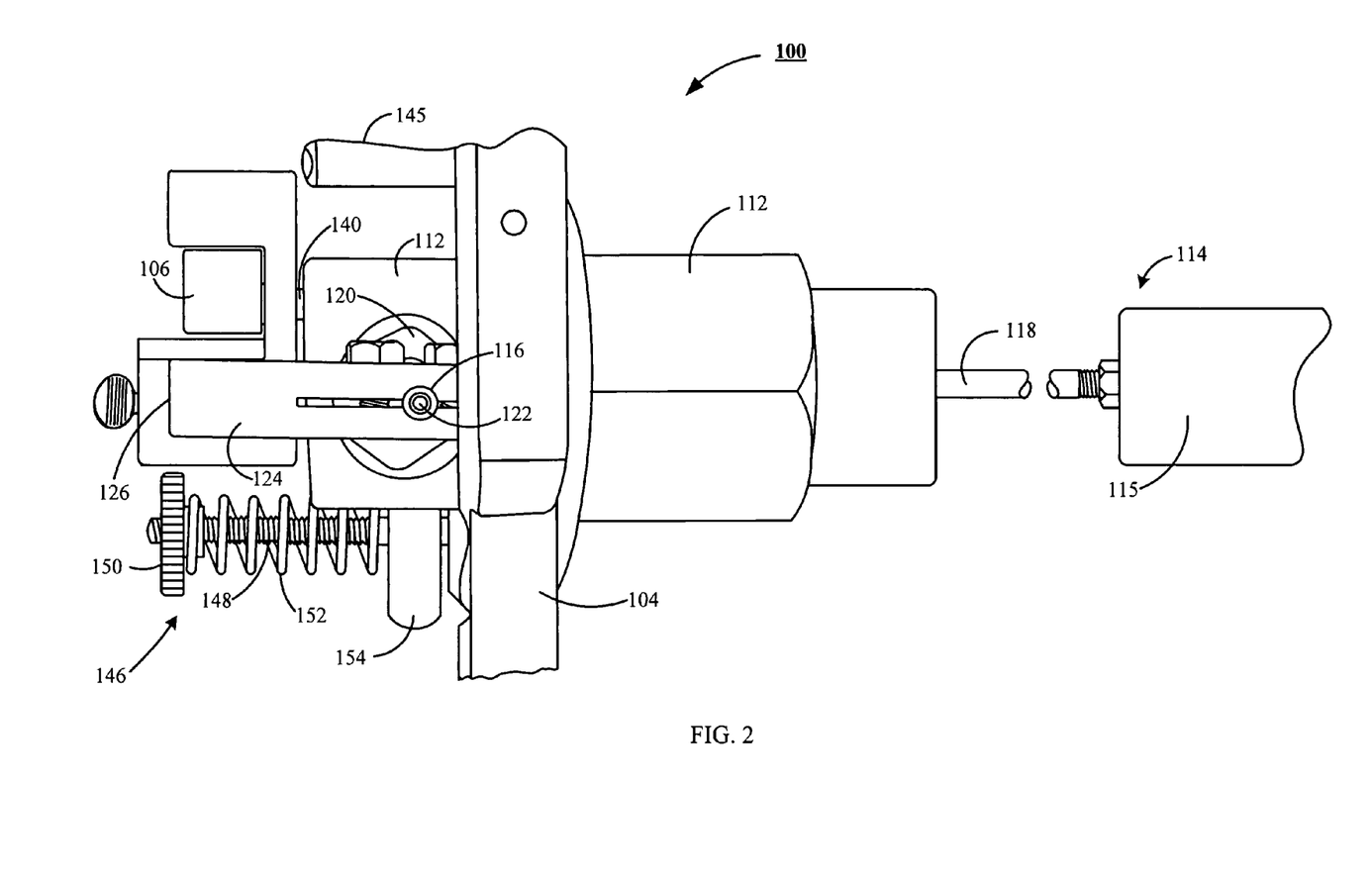
FIG. 2 shows a front elevational view of a double lobed fulcrum of the inventive liquid level controller of FIG. 1.

Turning to FIG. 2, the innovative fluid level controller apparatus 100, further preferably includes a level adjustment housing 112, that supports a level detection portion 114, which includes a displacer 115, (which is preferably a float device), secured to a level translation shaft 116, by a level response shaft 118. The level response shaft 118 changes its vertical position relative to the level adjustment housing 112, in response to changes in elevation of the displacer 115. The displacer 115 responds to changes in the elevational level of a fluid supporting the displacer 115. In a preferred embodiment, the fluid supporting the displacer 115 is confined within a vessel.

The level translation shaft 116 is secured to the level adjustment housing 112 by a bearing member 120. The bearing member 120 facilitates rotation of the level translation shaft 116 about a center of access 122 of the level translation shaft 116. The level translation shaft 116, translates the vertical motion of the level response shaft 118 into rotational motion for use by a level adjustment arm 124. The rotational motion of the level translation shaft 116 is used to create a vertical displacement of a distal end 126 of the level adjustment arm 124.

Returning to FIG. 1, in addition to the level adjustment arm 124 (of FIG. 2), a second level adjustment arm 128 is secured to the level translation shaft 116 (of FIG. 2), and moves in concert with the level adjustment arm 124 in response to the rotational motion of the level translation shaft 116. A fulcrum bar 130 is disposed between and held in place by the level adjustment arms 124, 128, and supports a fulcrum 132.

The fulcrum 132 includes a first lobe 134, a second lobe 136, and a fastening means 138 used to secure their position of the fulcrum 132 relative to the fulcrum bar 130. In a preferred embodiment, the fastening means constitutes a thumb screw, but could easily be an allen head screw, machines screw, rivet, pin, or other forms of fastening means. Preferably, the material used for the fulcrum bar 130 is a rigid polymer, such as PVC, but could easily be formed from other materials such as metal, fiberglass, or composites.

In a preferred embodiment, the first lobe 134 acts on the torque bar 106 in response to a rising level of fluid supporting the displacer 115 (of FIG. 2), by causing a clockwise rotation of the torque bar 106 about a pivot pin 140. The pivot pin 140 is attached to the level adjustment housing 112 and supports the torque bar 106 a predetermined distance from the control portion 104. The clockwise rotation of the torque bar 106 interacts with the pilot thrust pin 110, which causes the control portion 104 to generate and output a signal, signifying a rise in the level of the fluid acting on the displacer 115 has reached a predetermined elevational height.

In a preferred embodiment, the control portion 104 includes the control switch 108, that is preferably a pneumatic control switch 108, which is activated by the action of the pilot thrust pin 110. The result of the activation of the pneumatic control switch 108 by the pilot thrust pin 110 is a transfer of pressurized fluid from a pneumatic inlet port 142, (shown with a quick disconnect fitting 143 protruding from the pneumatic inlet port 142) to a pneumatic output port (not shown separately), which can be measured by an output pressure gauge 144. As will be appreciated by those skilled in the art, equivalent capabilities are available using electrical components, and can easily be substituted while remaining within the scope of the present inventive fluid level controller apparatus 100. A pneumatic based system was chosen to enhance and heighten an understanding of the present inventive fluid level controller apparatus 100, but does not serve to limit, nor is it intended to impose such a limitation on the present inventive fluid level controller apparatus 100.

In an alternate preferred embodiment, the second lobe 136 acts on the torque bar 106 in response to a lowering in the level of a fluid supporting the displacer 115 (of FIG. 2), by causing a counterclockwise rotation of the torque bar 106 about the pivot pin 140. The counterclockwise rotation of the torque bar 106 interacts with the pilot thrust pin 110, which causes the control portion 104 to generate and output a signal signifying a lowering in the level of the fluid acting on the displacer 115 has reached a predetermined elevational height. It will be noted that, in a preferred embodiment, the control portion 104 is mounted to the mounting plate 102 by means of control support standoffs 145, which are preferably sized to position the pilot thrust pin 110 in a predetermined relationship with the torque bar 106.

Continuing with FIG. 2, it is noted that in a preferred embodiment, the innovative fluid level controller 100 further includes a counterbalance mechanism 146. The counterbalance mechanism 146 has been found useful for "subtracting out" the mass of the level detection portion 114, i.e., offsetting the mass of the displacer 115, thereby allowing the displacer 115 to be more responsive to elevational changes experienced by a fluid supporting the displacer 115.

In a preferred embodiment, the counterbalance mechanism 146 includes at least a force adjustment shaft 148 interacting with a force adjustment knob 150 to modulate a force development member 152, which in a preferred embodiment is a compression spring 152. Preferably, the compression spring 152 is interposed between the force adjustment knob 150 and a force transfer portion 154 of the second level adjustment arm 128 (of FIG. 1).

Preferably, as the force developed by the compression spring 152 increases in response to an advancement of the force adjustment knob 150 along the force adjustment shaft 148 in the direction of the mounting plate 102 (of FIG. 1), a rotational motion is imparted on the level translation shaft 116. The rotational motion imparted on the level translation shaft 116 is translated into a vertical displacement of the level response shaft 118, which effectively acts to partially counteract the gravitational pull experienced by the displacer 115. Also preferably, the force imparted by the compression spring 152 on the force transfer portion 152 is just sufficient to bring the level response shaft 118 into a position parallel with the pivot pin 140.

Figure 3:
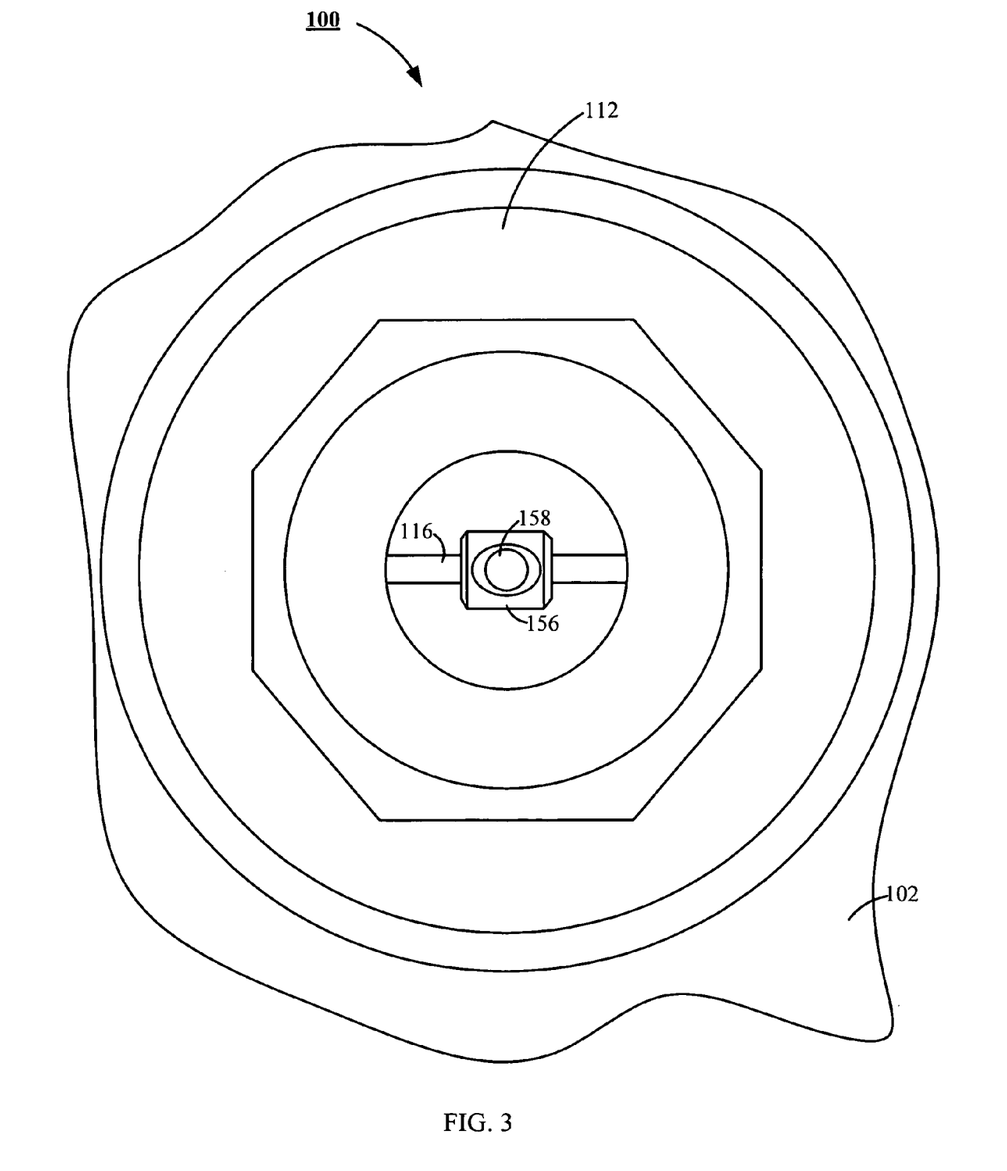
FIG. 3 is a right side elevational view of the double lobed fulcrum of the inventive liquid level controller of FIG. 2.

FIG. 3 shows that the level translation shaft 116 includes a shaft union 156. The shaft union 156 provides a means for connecting the level response shaft 118 (of FIG. 2) to the level translation shaft 116. In a preferred embodiment, the shaft union 156 provides a threaded mounting aperture 158 that interfaces with corresponding threads provided by the level response shaft 118.

Figure 4:
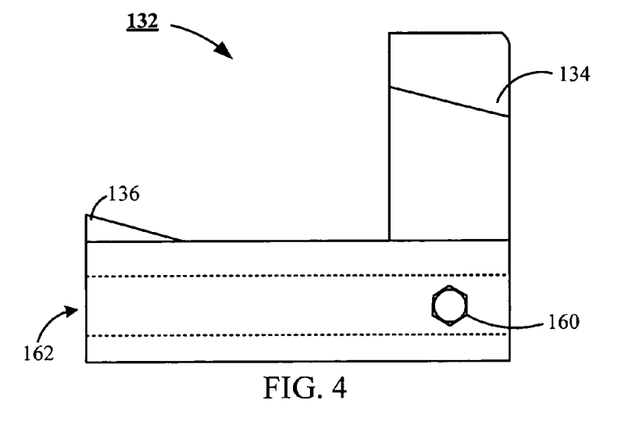
FIG. 4 is a left side elevational view of the double lobed fulcrum of the inventive liquid level controller of FIG. 2.
Figure 5:
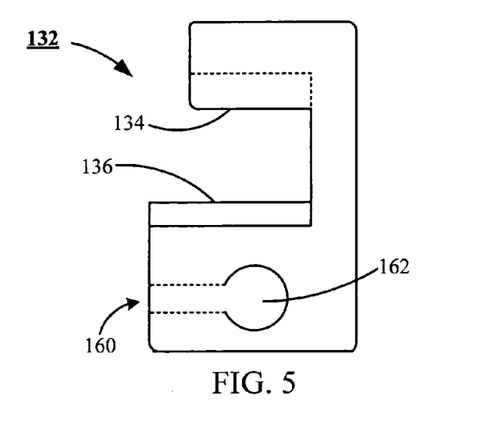
FIG. 5 is a partial cutaway, right side elevational view of the inventive liquid level controller of FIG. 1.
Figure 6:
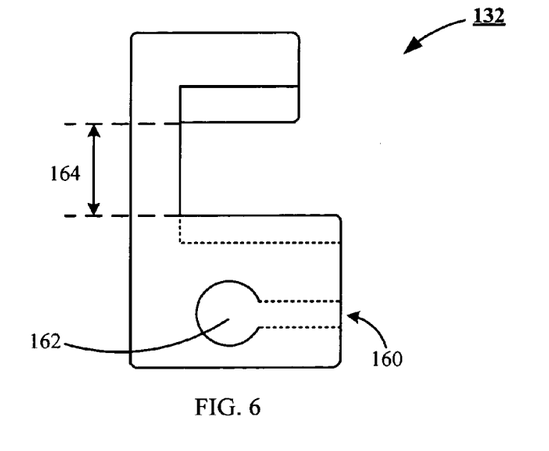
FIG. 6 shows a partial cutaway, rear elevational view of the inventive liquid level controller of FIG. 1.

FIGS. 4, 5, and 6 are preferably viewed in concert with one another, and they are provided to enhance an understanding of the present invention by those skilled in the art. FIG. 4 shows a fulcrum bar access aperture 160, sized to accommodate the fastening means 138 (of FIG. 1), and providing access to the fulcrum bar 130 (of FIG. 1). FIG. 5 shows a fulcrum mounting aperture 162 sized to provide a sliding interface between the fulcrum 132 and the fulcrum bar 130. FIG. 6 shows a vertical separation 164 between the first lobe 134 and the second lobe 136 is preferably sized to accommodate the torque bar 106 (of FIG. 1) in sliding communication with the first and second lobes 134, 136, when the torque bar 106 is in a neutral position.

Figure 7:
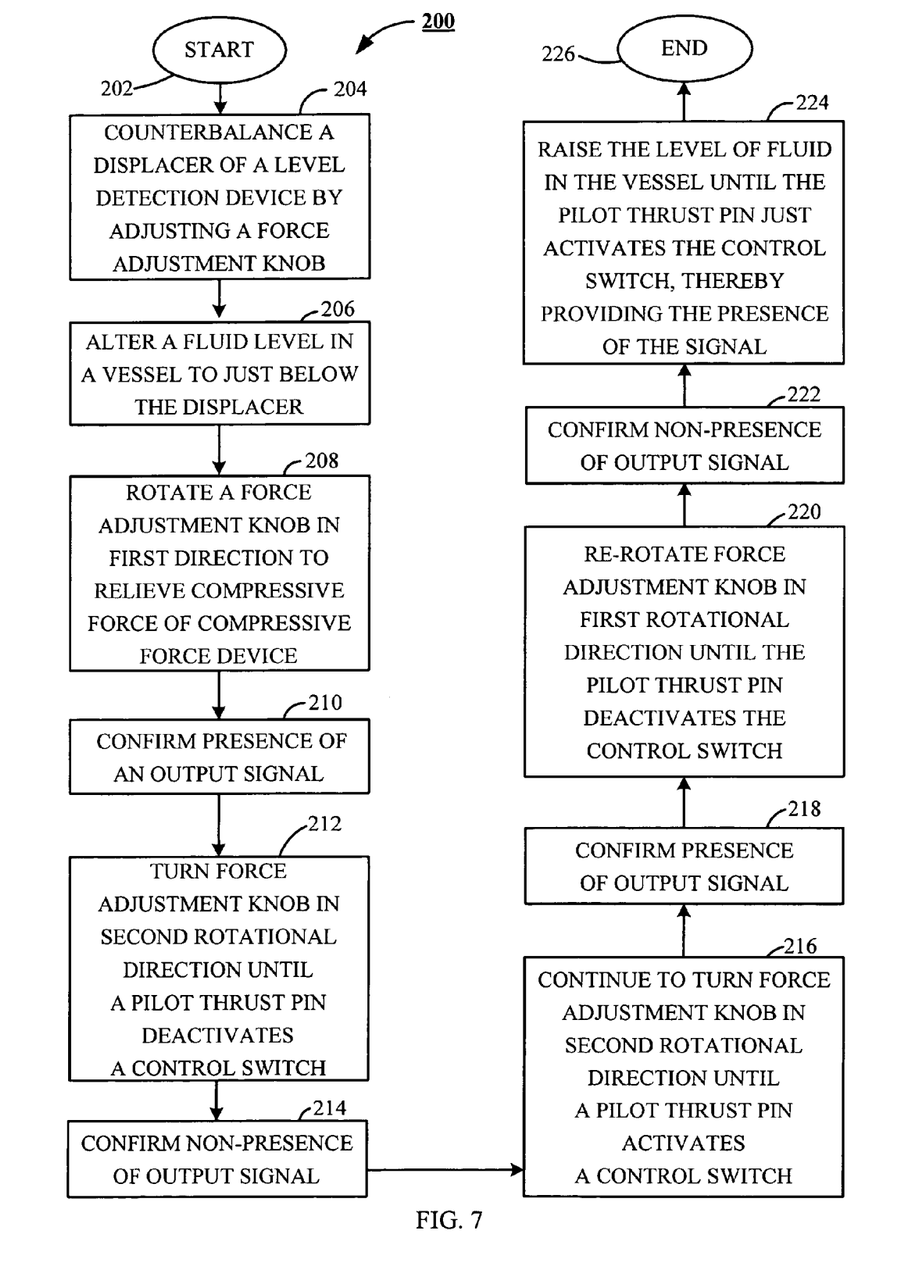
FIG. 7 illustrates a flow diagram of the method of using the inventive liquid level controller of FIG. 1, in a direct operating mode.

FIG. 7 shows method steps of a process 200 of using an inventive liquid level controller (such as fluid level controller 100). The process commences at start process step 202 and continues at process step 204. At process step 204, a displacer (such as 115) of the liquid level controller is counterbalanced by adjusting a force adjustment knob (such as 150), of a counterbalance mechanism (such as 146). The force adjustment knob is adjusted to position a fulcrum (such as 132), of the liquid level controller, into a neutral position relative to a torque bar (such as 106), of the liquid level controller. At process step 206, a level of fluid in a vessel is adjusted to just below a bottom portion of the displacer of the fluid level detection device. At process step 208, the force adjustment knob is rotated in a first rotational direction until all compressive force is relieved from a compressive force delivery device (such as compression spring 152 acting on the force adjustment knob, and at process step 210, a measurement device (such as pressure gauge 144) is read to confirm presence of an output signal.

Continuing with the process at process step 212, the force adjustment knob is rotated in a second rotational direction until a pilot thrust pin (such as 110) just deactivates a control switch (such as 108), thereby halting the presence of the output signal. At process step 214, the measurement device is re-read to confirm the non-presence of the output signal. At process step 216, turning of the force adjustment knob in the second direction is continued until the pilot thrust pin just activates the control switch, thereby providing the presence of the output signal, which is confirmed by reading the measurement device at process step 218.

At process step 220, the force adjustment knob is re-rotating in the first rotational direction until the pilot thrust pin just deactivates the control switch, thereby halting the presence of the output signal. The presence of the output signal is confirmed at process step 222 by re-reading the measurement device. At process step 224, the level of fluid in the vessel is raised until the pilot thrust pin just activates the control switch, thereby providing the presence of the output signal, and the process concludes at end process step 226.

Figure 8:
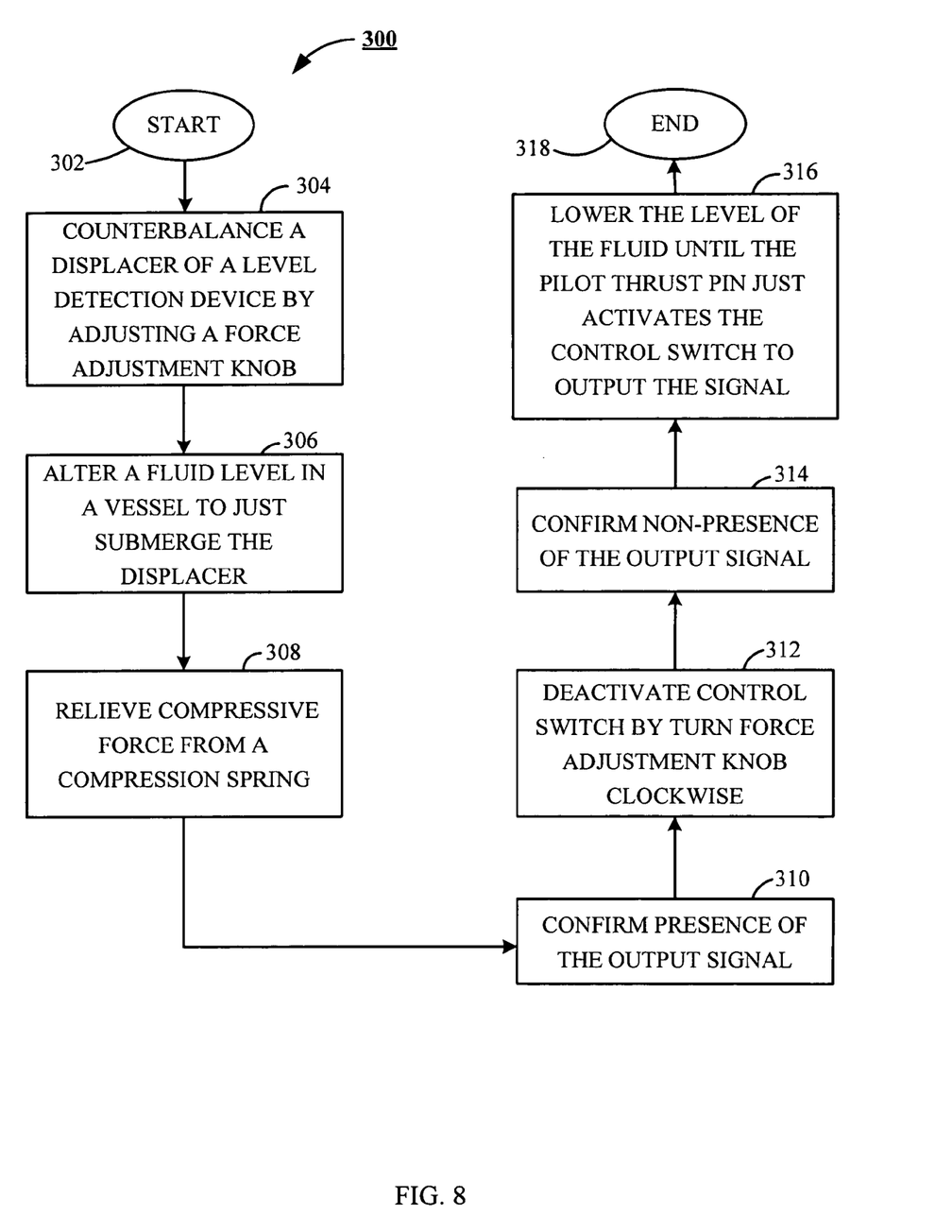
FIG. 8 illustrates a flow diagram of the method of using the inventive liquid level controller of FIG. 1, in an indirect operating mode.

FIG. 8 shows method steps of an alternate process 300 of using an inventive liquid level controller (such as fluid level controller 100). The process commences at start process step 302 and continues at process step 304. At process step 304, a displacer (such as 115) of the liquid level controller is counterbalanced by adjusting a force adjustment knob (such as 150) of a counterbalance mechanism (such as 146). The force adjustment knob is adjusted to position a fulcrum (such as 132) of the liquid level controller into a neutral position relative to a torque bar (such as 106) of the liquid level controller. At process step 306, a level of fluid in a vessel is adjusted to submerge the displacer of the fluid level detection device.

At process step 308 the force adjustment knob is rotated in the counterclockwise direction until all compressive force acting on the force adjustment knob is relieved from a compression spring (such as 152), which activates an output signal from a control switch (such as 108). At process step 310, a measurement device (such as pressure gauge 144) is read to confirm presence of the output signal.

At process step 312, the force adjustment knob is turned in a clockwise direction until a pilot thrust pin (such as 110) just deactivates the control switch, thereby providing the non-presence of the output signal. At process step 314, the measurement device is re-read to confirm the non-presence of the output signal. At process step 316, the level of the liquid is lowered until the pilot thrust pin just activates the control switch, thereby providing the presence of the output signal, and the process concludes at end process step 318.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. An apparatus comprising:
  a fluid level detection portion;
  a fulcrum responsive to the fluid level detection portion, the fulcrum providing at least a first lobe and a second lobe;
  a control portion responsive to the first lobe when the apparatus is operated in a first operating mode, and responsive to the second lobe when the apparatus is operated in a second operating mode, and wherein the fulcrum is positioned in a common location for both the first and second operating modes of the apparatus, and in which the control portion comprises a control switch; and
  a counterbalance mechanism linked to the fluid level detection device, wherein the control switch operates in the first mode when a first balance force is applied to the fluid level detection device by the counterbalance mechanism, and further operates in the second mode when a second balance force is applied to the fluid level detection device by the counterbalance mechanism.

2. The apparatus of claim 1, in which the control portion comprises a control switch activated by a pilot thrust pin, and further comprising:
   a mounting plate supporting the control portion;
   a level adjustment housing secured to the mounting plate; and
   a level response shaft linked to the fluid level detection portion and mounted for rotation within the level adjustment housing, the level response shaft translating a vertical displacement of the fluid level detection portion into a rotational motion.

3. The apparatus of claim 2, further comprising:
   a level adjusting arm secured to the level response shaft;
   a fulcrum bar attached to the level adjusting arm and supporting the fulcrum;
   a torque bar adjacent to the fulcrum and mounted for rotation relative to the level adjustment housing, the torque bar translating rotational motion of the level response shaft to a vertical displacement of the pilot thrust pin, wherein the vertical displacement of the pilot thrust pin activates the control switch.

4. The apparatus of claim 3, further comprising a counterbalance mechanism linked to the fluid level detection device, wherein the control switch operates in the first mode when a first balance force is applied to the fluid level detection device by the counterbalance mechanism, and further operates in the second mode when a second balance force is applied to the fluid level detection device by the counterbalance mechanism.

5. The apparatus of claim 4, in which the control switch is a pneumatic control switch.

6. The apparatus of claim 5, in which the level adjusting arm comprises a force transfer portion, and in which the counterbalance mechanism comprises:
   a force adjustment shaft secured to the mounting plate;
   a force adjustment knob communicating with the tension adjustment shaft;
   a force development member interposed between the force adjustment knob and the force transfer portion of the level adjusting arm, the force development member developing a response force proportional to a position of the force adjustment knob relative to the force adjustment shaft.

7. The apparatus of claim 5, in which the force adjustment shaft provides external threads, the force adjustment knob provides internal threads configured for interaction with the external threads of the force adjustment shaft, the force development member is a compression spring, and the pneumatic control switch provides a pneumatic signal in response to the vertical displacement of the pilot thrust pin.

* * * * *